United States Patent Office 3,447,154
Patented May 27, 1969

3,447,154
COOPERATIVE DOPPLER RADAR SYSTEM
James H. Schrader, Newport News, Va., assignor to the United States of America as represented by the Administrator of the National Aeronautics and Space Administration
Filed Oct. 17, 1967, Ser. No. 676,391
Int. Cl. G01s 9/56
U.S. Cl. 343—6.5                                10 Claims

ABSTRACT OF THE DISCLOSURE

This invention is an apparatus for aiding a pilot in avoiding midair collisions between aircraft. A protected aircraft carries a transmitter, a transponder and a receiver; and and intruding cooperating aircraft carries a transponder. The transmitter of the protected aircraft transmits a pair of continuous wave signals to the transponder of the intruding aircraft. The intruding aircraft's transponder mixes the two signals and retransmits a difference frequency signal back to the protected aircraft. The protected aircraft compares the retransmitted signal with the difference between the pair of transmitted signals to determine the Doppler frequency. The Doppler frequency is a measure of the range rate between the intruding aircraft and the protected aircraft while the intensity of the return signal is a measure of the range between the two aircrafts. When a possible collision condition is detected, the pilot of the protected aircraft is warned so that he can take the necessary evasive action. In addition, apparatus is provided for allowing all aircraft to operate on the same frequency bands by utilizing a means to suppress the numerous cross-modulation products that are generated when a plurality of protected aircraft interrogate the transponder of an intruding aircraft.

---

The invention described herein was made by an employee of the United States Government and may be manufactured and used by or for the Government for governmental purposes without the payment of any royalties thereon or therefor.

Background of the invention

In recent years, the use of aircraft as a transportation medium has become extremely widespread, resulting in a tremendous growth of private, commercial and military aircraft. And, as the number of aircraft has increased, the probability of midair collisions has also increased. Because an aircraft can receive a collision from numerous angles that are out of the view of the pilot, even the most observant pilot is subject to the possibility of a midair collision. Even when another aircraft is located in what is normally an observable region, it may be obscured by clouds, fog or haze, for example. Hence, it is desirable to provide a system that aids the pilot by warning him of approaching or intruding aircraft.

The prior art has, to some extent, attempted to solve the problem of midair aircraft collisions. It has proposed various systems for detecting the possibility of midair collisions so that pilots can be warned in time to take evasive action. Complex radar systems either mounted on an aircraft or located on the ground have been proposed and are in use. The major disadvantage of these systems is their complexity, making them subject to failure. In addition, their complexity makes them expensive. Hence, in addition to providing a system to aid in preventing midair collisions, it is also desirable to provide such a system that is relatively simple and low in cost while being sufficiently variable so that its performance and cost can be varied over a range that allows its use on small, inexpensive aircraft as well as large, expensive aircraft depending upon the degree of protection desired.

Therefore, it is an object of this invention to provide an apparatus for aiding a pilot in avoiding midair collisions.

It is also an object of this invention to provide an apparatus that warns a pilot of a possible collision, yet is uncomplicated and low in cost.

It is another object of this invention to provide an apparatus for warning a pilot of a midair collision that is suitable for use on small as well as large aircraft.

It is a further object of this invention to provide a pilot warning apparatus that warns of possible midair collisions with a plurality of aircraft without becoming saturated.

It is an additional object of this invention to provide a pilot warning system that is flexible in complexity and cost, making it suitable for use on a wide range of aircraft.

Summary of the invention

In accordance with a principle of this invention, an apparatus for warning a pilot of a possible midair collision is provided. A protected aircraft carries a transmitting means that transmits a signal to intruding aircraft. The intruding aircraft carry transponder means that receive the transmitted signal, electronically manipulate it, and retransmit a signal. The retransmitted signal is received by a receiver carried by the protected aircraft. The protected aircraft compares the transmitted signal with the retransmitted signal to determine the range rate between the two aircraft. This range rate signal aids in determining the possibility of a midair collision between the two aircraft.

In accordance with another principle of this invention, the protected aircraft transmits a pair of signals. This pair of signals is mixed by the transponder in the intruding aircrafts to develop a difference frequency signal. This difference frequency signal is compared in the protected aircraft with the difference between the pair of transmitted signals to determine the Doppler frequency. The Doppler frequency is a measure of range rate and the intensity of the return signal is a measure of the range. When these two measurements are suitably interpreted, they determine the possibility of a midair collision.

In accordance with a further principle of the invention, the transmitter of the protected aircraft is randomly modulated so that the effect of cross-modulation products that are generated when a transponder is interrogated by more than one aircraft can be eliminated. That is, cross-modulation products of undesired signals are suppressed by the use of random modulation.

It will be appreciated that the invention is a rather uncomplicated and inexpensive means for aiding a pilot in avoiding aircraft collisions. A simple transponder is located on all airplanes whether large or small. Airplanes desiring protection also have a transmitter and a receiver. The transmitters of protected aircraft interrogate transponders of all intruding aircraft and the protected aircraft's receivers determine the possibility of collision with the intruding aircraft. When this determination is made, the pilot of the protected aircraft is warned so that he can take suitable evasive action. In addition, the use of random modulation allows a common frequency allocation to be utilized by all aircraft. A fixed modulation technique would require that each aircraft have a separate channel, however, by comparing a randomly modulated transmitted signal with a like randomly modulated retransmitted signal, a system is provided that suppresses unwanted signals without the necessity of providing separate channels and sophisticated electronic suppression systems.

Brief description of the drawings

The foregoing objects and many of the attendant advantages of this invention will become more readily appreciated as the same becomes better understood by reference to the following detailed description when taken in conjunction with the accompanying drawings wherein.

Description of the preferred embodiments

Figure 1:
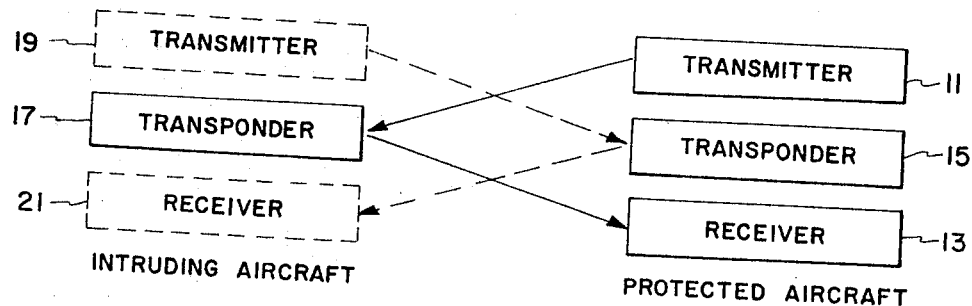
FIG. 1 is a block diagram illustrating the general concept of the invention.

FIG. 1 illustrates in block form the general concept of the invention. The items carried by a protected aircraft are illustrated on the right of FIG. 1 and the items carried by an intruding aircraft are illustrated on the left. The protected aircraft carries a transmitter 11, a receiver 13 and, preferably, a transponder 15. The intruding aircraft carries at least a transponder 17.

The transmitter 11 of the protected aircraft transmits an interrogating radar signal that passes along the upper arrowed solid line illustrated in FIG. 1 to the transponder 17 of the intruding aircraft. The transponder electronically manipulates the transmitted signal and retransmits a signal to the receiver 13 of the protected aircraft along the lower arrowed solid line. The receiver compares the transmitted signal with the retransmitted signal and generates an indicating signal. This indicating signal warns the pilot of the possibility of a midair collision between the two aircraft if the possibility of such a condition exists. If such a condition exists, the pilot can take the appropriate evasive action.

In addition to carrying the transponder 17, the intruding aircraft may also carry a transmitter 19 and a receiver 21, illustrated in dotted form in FIG. 1, so that the intruding aircraft can interrogate the transponder 15 of the protected aircraft and also be warned of the possibility of a collision.

From the foregoing description of the general concept of the invention as illustrated in FIG. 1, it will be appreciated that the invention is a simple, inexpensive radar system.

Figure 2:
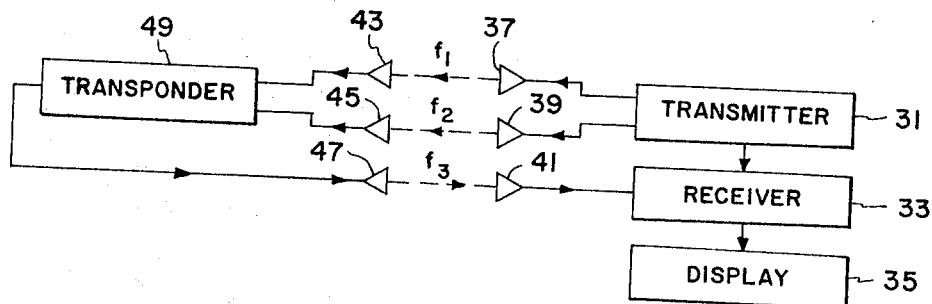
FIG. 2 is a block diagram illustrating one embodiment of the invention.

FIG. 2 illustrates the operation of the invention. A transmitter 31 on the protected aircraft generates a C.W. (continuous wave) signal at a frequency $f_1$ which is transmitted from a first antenna 37. The transmitter 31 also generates another C.W. signal at the frequency $f_2$ which is transmitted from a second antenna 39. These signals are received at the intruding aircraft on a pair of antennas 43 and 45. The signal received on antenna 43 is at a frequency equal to the transmitted frequency $f_1$ plus a Doppler shift $\Delta f_1$ due to the relative velocity between the two aircraft. Similarly, the signal received on antenna 45 is at a frequency $f_2$ plus $\Delta f_2$. A transponder 49 amplifies and mixes these two received signals to generate a signal at the difference frequency $$f_3(f_3 = f_1 - f_2 + \Delta f_1 - \Delta f_2)$$

which is retransmitted from an antenna 47. This retransmitted signal is received at the protected aircraft on an antenna 41. This received signal is at a frequency equal to the retransmitted frequency $f_3$ plus another Doppler shift $\Delta f_3 (\Delta f_3 = \Delta f_1 - \Delta f_2)$. This received signal is applied to a receiver 35. The receiver 35 also receives a difference signal $(f_1 - f_2)$ directly from the transmitter. The receiver compares these two signals to derive a signal at the Doppler frequency $2\Delta f_3$ proportional to the relative velocity between the two aircraft. Due to the two-way transmission and the multiplication in the transponder 49, the power level of this signal varies inversely as the sixth power of the range between the two aircraft. This signal, therefore, contains information concerning both the range and the range rate between the two aircraft and is applied to a suitable display device 35 which can indicate the hazard that exists relative to a collision.

The receiving antenna 41, the receiver 33, and the display 35 can take on numerous forms depending upon the desired protection and/or cost of the equipment installed on a protected aircraft. For example, in an uncomplicated system, the protected aircraft receives the retransmitted signal on a simple, relatively nondirectional antenna with a single channel receiver which actuates a simple audio or visual display that merely indicates that an intruding aircraft is near and the rate at which it is approaching. In this manner, the pilot is warned of an approaching aircraft so that he can take evasive action if his sight indicates that it is required. Basically, all this simple system does is put the pilot on notice of an approaching aircraft.

A more complex receiving and display system uses a simultaneous lobed directional antenna and multichannel receiver for receiving the retransmitted signal from the intruding aircraft. The use of this type antenna and receiver allows the protected aircraft to determine the direction (azimuth and/or elevation angles) of approach of the intruding aircraft. Hence, the display means designates direction as well as rate of approach.

An addition to either display system includes means for measuring the intensity of the received signal to determine the approximate distance of the intruding aircraft from the protected aircraft.

A still more complex system utilizes a conventional spectrum analyzer(s) sweeping the output of the receiver (Doppler frequency band) to separate multiple signals received from more than one intruding aircraft. The outputs from this analyzer are applied to the previously mentioned forms of display to indicate the various parameters for all intruding aircraft.

Alternative to a display means designating the approach of an intruding aircraft, the display means could indicate a course of action to the pilot of the protected aircraft when an intruding aircraft is detected. That is, rather than indicating that an intruding aircraft is located in a particular quadrant of a display system, the indicating means could indicate that the protected aircraft should move to a different quadrant.

From the foregoing discussion, it will be appreciated that the display means can take on a plurality of forms. In addition, suitable suppression means can be included in the various display systems for suppressing any signals relating to intruding aircraft that are moving away from the protected aircraft because there is no possibility of collision with those aircraft.

Figure 3:
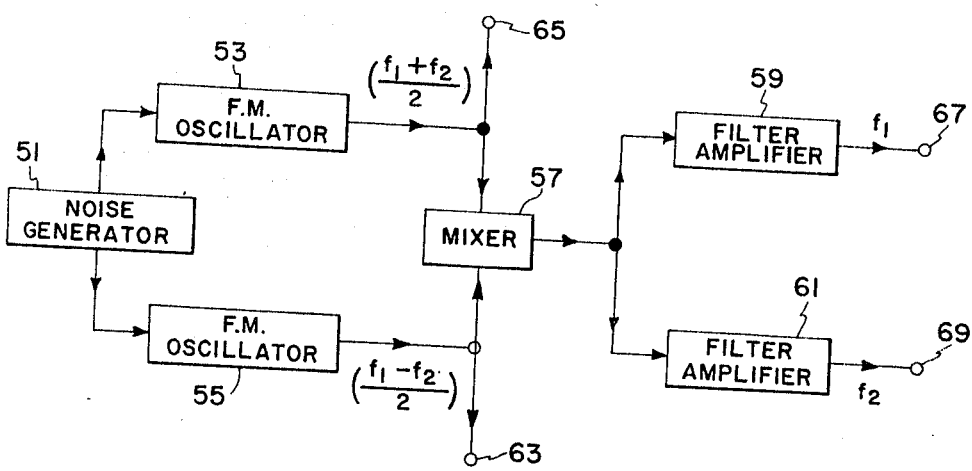
FIG. 3 is a block diagram of a transmitter suitable for use in the embodiment of the invention illustrated in FIG. 2.

FIG. 3 illustrates a simple transmitter suitable for use in the embodiment of the invention illustrated in FIG. 2 for generating the transmitted signals at frequencies $f_1$ and $f_2$. The transmitter illustrated in FIG. 3 comprises: a noise generator 51; a first F.M. (frequency modulated) oscillator 53; a second F.M. oscillator 55; a mixer 57; a first filter/amplifier (tuned R.F. amplifier) 59; and a second filter/amplifier 61. The noise generator has two outputs which are independently controlled in both spectral content and amplitude. These two outputs are connected to the inputs of the two F.M. oscillators 53 and 55 in such a manner that the frequencies of the signals generated vary with respect to time in a psuedo-random manner, with the controlled parameters being the peak frequency excursion and the maximum rate-of-change of frequency. These parameters are controlled in accordance with the allocated R.F. bandwidth and the expected time delay resulting from the transmission to and from the intruding aircraft; The first oscillator 53 generates a signal at a frequency of $$\frac{f_1+f_2}{2}$$

The second oscillator 55 generates a signal at a frequency $$\frac{f_1-f_2}{2}$$

These two signals are applied to the mixer 57. The output of the mixer 57 is applied to the two filter/amplifiers 59 and 61. The first filter/amplifier 59 selects the sum frequency $f_1$ generated in the mixer, amplifies it, and presents it at a first output terminal 67 for transmission. The second filter/amplifier 61 selects the difference frequency $f_2$ generated in the mixer, amplifies it, and presents it at a second output terminal 69 for transmission. These signals are, as illustrated in FIG. 2, transmitted to the transponders of all intruding aircraft. Signals whose frequencies are proportional to the difference and sum of the transmitted frequencies are available at terminals 63 and 65, respectively, for use in the receiver and transponder of the protected aircraft.

It will be appreciated that the use of the noise generator 51 to randomly modulate the F.M. oscillators, hence, the transmitted signals, allows a common frequency allocation or band to be used by a plurality of aircraft when interrogating a single transponder. That is, because of the random modulation, the receiver of each protected aircraft will accept only the retransmitted signal with a F.M. characteristic related to its own transmitted F.M. characteristic and suppress all other signals. An example of a receiver that operates in such a manner is illustrated in FIG. 5.

Figure 5:
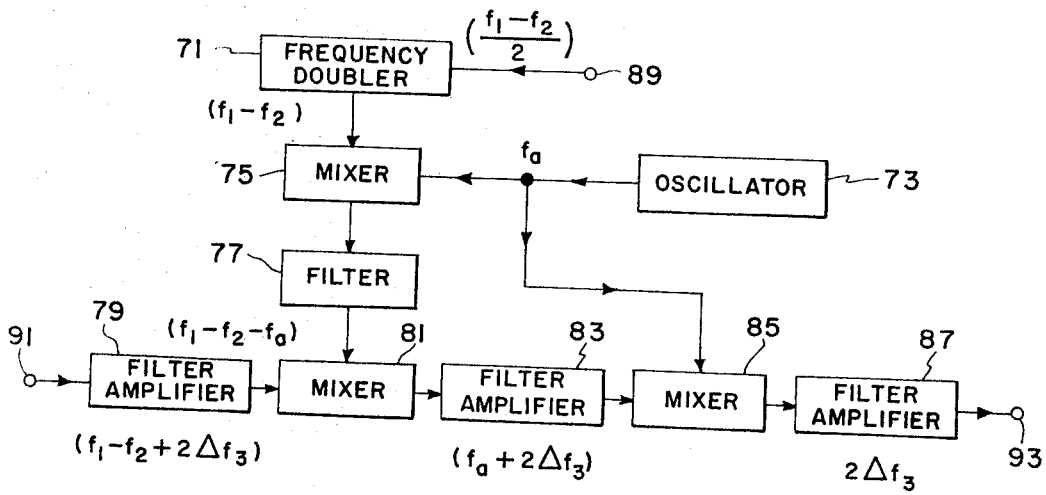
FIG. 5 is a block diagram of a receiver suitable for use in the embodiment of the invention illustrated in FIG. 2.

FIG. 5 illustrates a receiver suitable for use on a protected aircraft that comprises: a frequency doubler 71; a local oscillator 73; a first mixer 75; a filter 77; a first filter/amplifier (tuned R.F. amplifier) 79; a second mixer 81; a second filter/amplifier (tuned I.F. amplifier) 83; a third mixer 85; and a third filter/amplifier (A.F. amplifier) 87.

A first input terminal 89 is connected to the output terminal 63 of the transmitter and the input to the frequency doubler 71 such that the signal out of the frequency doubler 71 is at a frequency $(f_1-f_2)$ equal to the difference of the transmitted frequencies. This signal is applied to one input of the first mixer 75. The other input to the first mixer 75 is connected to the output $(f_a)$ of the local oscillator 73. The output of the first mixer 75 is applied to the filter 77 which selects the signal whose frequency $(f_1-f_2-f_a)$ is equal to the difference of the frequencies of the two applied signals. This signal is applied to one input to the second mixer 81.

A second input terminal 91 is adapted to receive the difference signal retransmitted by the transponder 49 of the intruding aircraft from a suitable antenna. This signal, whose frequency $(f_1-f_2+2\Delta f_3)$ is equal to the difference of the transmitted frequencies $(f_1, f_2)$ plus the Doppler shift $2\Delta f_3$ incurred in the transmission to and from the intruding aircraft, is applied through the first filter/amplifier 79 to the second input of the second mixer 81. The output of the second mixer 81 is applied to the second filter/amplifier 83 which selects and amplifies the signal whose frequency $(f_a+2\Delta f_3)$ is equal to the difference of the frequencies of the two applied signals.

It will be appreciated that the filter in the second filter/amplifier 83 can be designated such that it will reject signals with Doppler frequency shifts $(-2\Delta f_3)$ resulting from a receding aircraft and accept signals with Doppler frequency shifts $(+2\Delta f_3)$ resulting from an approaching aircraft since one is at a frequency $(f_a-2\Delta f_3)$ below, and the other is at a frequency $(f_a+2\Delta f_3)$ above the oscillator frequency $f_a$.

The output of the second filter/amplifier 83 is applied to one input of the third mixer 85. The second input of the third mixer 85 is derived from the local oscillator 73. The output of the third mixer 85 is applied to the third filter/amplifier 87 which selects and amplifies in signal whose frequency $(2\Delta f_3)$ is equal to the difference of the frequencies of the two applied signals. The output of this filter/amplifier 87 is, therefore, a signal whose frequency is directly proportional to the closing velocity (rate-of-change between the two aircraft and whose amplitude is inversely proportional to the sixth power of the range between the two aircraft. Hence, both quantities are known to the pilot of the protected aircraft when this output signal is suitably displayed.

Figure 4:
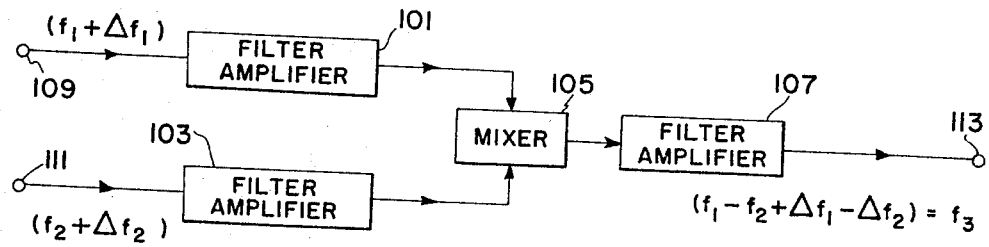
FIG. 4 is a block diagram of a transponder suitable for use in the embodiment of the invention illlustrated in FIG. 2.

FIG. 4 is a block diagram of an uncomplicated transponder that is suitable for use in the embodiment of the invention illustrated in FIG. 2. The transponder illustrated in FIG. 4 comprises: a first filter/amplifier (tuned R.F. amplifier) 101; a second filter/amplifier (tuned R.F. amplifier) 103; a mixer 105; and a third filter/amplifier (tuned R.F. amplifier) 107. The first filter/amplifier 101 is connected to a first input terminal 109 which is connected to the antenna 43 suitable for receiving the transmitted signal at frequency $(f_1+\Delta f_1)$. The second filter/amplifier is connected to a second input terminal 111 which is connected to an antenna 45 (FIG. 2) suitable for receiving the transmitted signal at frequency $(f_2+\Delta f_2)$. These two filter/amplifiers each pass and amplify their input signals while filtering out undesired signals. The outputs of the first and second filter/amplifiers 101 and 103 are applied to the two inputs of the mixer 105. The output of the mixer 105 is connected to the third filter/amplifier 107 which selects and amplifies the signal existing at the difference frequency $(f_1-f_2+\Delta f_1-\Delta f_2)$. This signal is applied to terminal 113 which is connected to the transmitting antenna 47 illustrated in FIG. 2.

It will be appreciated that the system illustrated in FIG. 4 is an uncomplicated transponder for mixing a pair of input signals and generating a signal at their difference frequency. This simplicity results in a reliable system that can be inexpensively produced. Hence, the transponder per se is suitable for use on small private aircraft as well as large private, military and commercial aircraft.

It will be appreciated that the invention illustrated in FIGS. 2–5 is a complete cooperative Doppler radar system. The protected aircraft carries a transmitter for transmitting appropriate C.W. signals and a receiver for receiving a return signal modified by a transponder carried by an intruding aircraft. It will also be appreciated that all of the systems illustrated in FIGS. 3–5 for carrying out the basic concept illustrated in FIG. 2 are uncomplicated and, therefore, reliable and inexpensive. And, because this system is uncomplicated, reliable and inexpensive, it is suitable for widespread commercial use.

Figure 6:
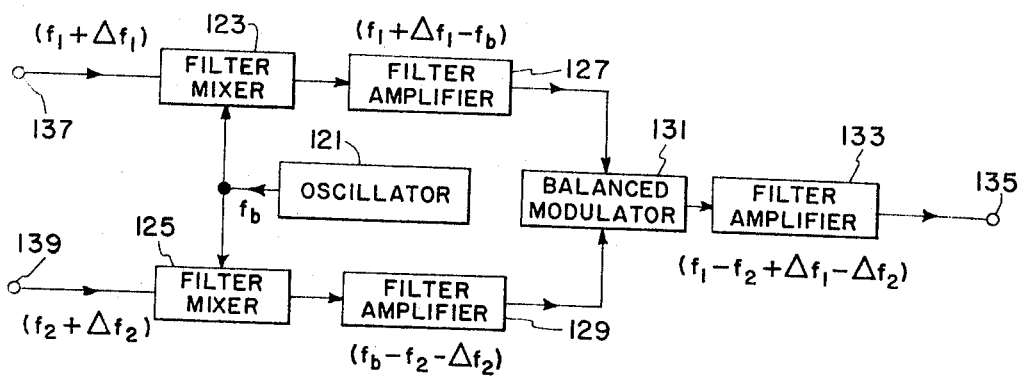
FIG. 6 is an alternative embodiment of a transponder suitable for use in the embodiment of the invention illustrated in FIG. 2.

It is well known that an I.F. system that electronically manipulates a signal is more suitable in some environments than is a system that directly manipulates a signal. FIG. 6 illustrates a modification of the transponder of FIG. 4 that utilizes an I.F. signal to provide a transponder that is somewhat more complicated but may be somewhat more desirable in some environments than the transponder illustrated in FIG. 4.

The transponder illustrated in FIG. 6 comprises: an oscillator 121; a first filter/mixer 123; a second filter/mixer 125; a first filter/amplifier (tuned I.F. amplifier) 127; a second filter/amplifier (tuned I.F. amplifier) 129; a balanced modulator 131; and a third filter/amplifier (tuned R.F. amplifier) 133. A first input terminal 137 accepts the signal $(f_1+\Delta f_1)$ received on one of the transponder antennas 43 (FIG. 2) and applies it to the first filter/mixer 123. A second input terminal 139 accepts the signal received on another transponder antenna 45 (FIG. 2) and applies it to the second filter/mixer 125. The oscillator 121 generates a signal at a frequency $$f_b \left( f_b \text{ approx. equal } \frac{f_1+f_2}{2} \right)$$

between $f_1$ and $f_2$ and applies it to both mixers 123 and 125 to convert both received signals to an I.F. signal approximately equal to ½ the difference frequency $$\left( \frac{f_1-f_2}{2} \right)$$

These signals are applied to the first and second filter/amplifiers 127 and 129 where they are amplified. The outputs of these amplifiers are applied to the first and second inputs to the balanced modulator 131. The output of this modulator 131 is applied to the input of the third filter/amplifier 133 which selects and amplifies the signal which is at the frequency equal to the sum of the frequencies of the two signals applied to the modulator 131. The output of this filter/amplifier 133 is at a frequency $(f_1-f_2+\Delta f_1-\Delta f_2)$ equal to the difference of the frequencies of the two received signals at terminals 137 and 139, and is connected through terminal 135 to the transmitting antenna 47 illustrated in FIG. 2.

It will be appreciated that the use of a transponder as illustrated in FIG. 6 allows the primary signal amplification to be obtained at an intermediate frequency lower than the input frequencies.

Figure 7:
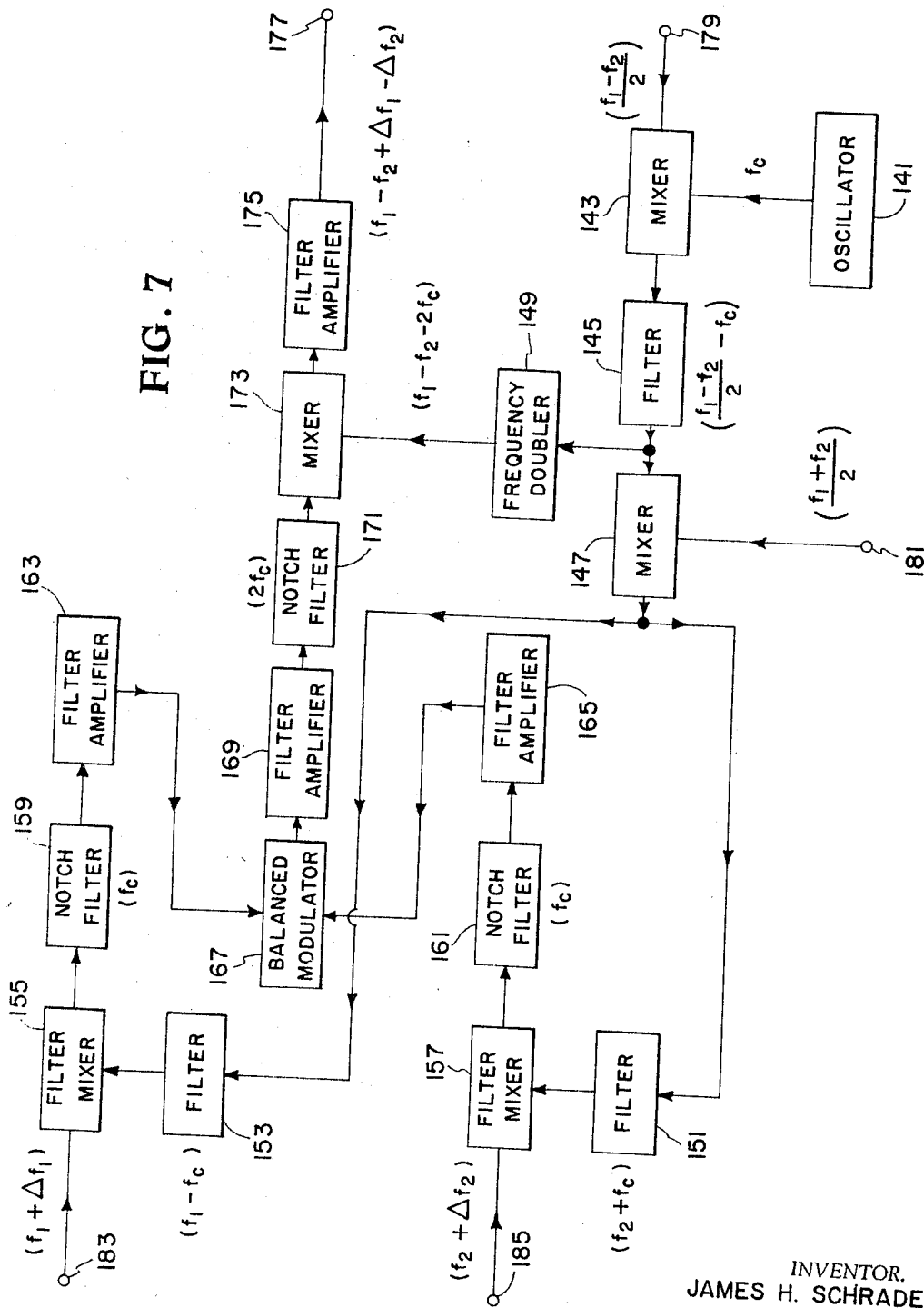
FIG. 7 is a block diagram of a somewhat more complex embodiment of a portion of the invention.

FIG. 7 illustrates a somewhat more complicated transponder that, in addition to accomplishing the functions of the transponders previously illustrated, has the ability to reject signals resulting from coupling to an associated transmitter-receiver (i.e., one on the same aircraft) by obtaining its local oscillator or conversion signals from transmitter derived signals. This transponder comprises: an oscillator 141; a first mixer 143; a first filter 145; a second mixer 147; a frequency doubler 149; a second filter 151; a third filter 153; a first filter/mixer 155; a second filter/mixer 157; a first notch reject filter 159; a second notch reject filter 161; a first filter/amplifier (tuned I.F. amplifier) 163; a second filter/amplifier (tuned I.F. amplifier) 165; a balanced modulator 167; a third filter/amplifier (tuned I.F. amplifier) 169; a third notch reject filter 171; a third mixer 173; and a fourth filter/amplifier (tuned R.F. amplifier) 175.

A first terminal 179 is connected to the transmitter terminal 63 (FIG. 3) thereby applying a signal at a frequency $$\left( \frac{f_1-f_2}{2} \right)$$

to one input of the first mixer 143. The oscillator 141 applies a signal at a frequency $f_c$ to the other input of mixer 143. The output of mixer 143 is connected to filter 145 which selects a signal at a frequency $$\left( \frac{f_1-f_2}{2} - f_c \right)$$

equal to the difference between the frequencies of the two signals applied to the first mixer 143. This signal is then applied to one input of the second mixer 147.

The other input to the second mixer 147 is connected to the transmitter through terminals 181 (FIG. 7) and 65 (FIG. 3) to obtain a signal at a frequency $$\left( \frac{f_1+f_2}{2} \right)$$

The output of the second mixer 147 is connected in parallel to the second and third filters 151 and 153. These filters 151 and 153 select signals at the difference and sum frequencies of the two signals applied to the mixer 147. The use of this technique results in local oscillator signals $[(f_1-f_c) \text{ and } (f_2+f_c)]$ which are randomly modulated in exactly the same manner as the two transmitted signals from the associated transmitter. The transponder receiving antennas 43 and 45 are connected to terminals 183 and 185, respectively. These terminals 183 and 185 are separately connected to the first and second filter/mixers 155 and 157. The received signals are therefore applied to the first inputs of the first and second filter/mixers 155 and 157. The transmitter derived local oscillator signals obtained at the outputs of the second and third filters 153 and 151 are separately applied to the second inputs of the first and second filter/mixers 155 and 157. The signals received from the associated transmitter are thus converted by the mixers from signals whose frequency is variable with respect to time to signals whose frequency is stationary with respect to time. The outputs of the first and second filter/mixers are separately connected to the first and second notch reject filters 159 and 161. These filters reject all signals originating from the associated transmitter while only slightly attenuating all other signals. The outputs of the notch filters 159 and 161 are connected to the first and second filter/amplifiers 163 and 165 which select and amplify the desired I.F. signals. The outputs from the first and second filter/amplifiers 163 and 165 are applied to the two inputs of the balanced modulator 167. The output of the balanced modulator 167 is connected to the third filter/amplifier 169 which selects and amplifies the signal whose frequency is equal to the sum of the frequencies of the two signals applied to the modulator 167. This signal is applied to another notch reject filter 171 which rejects all transponder transmissions which would be received by the associated transmitter-receiver. The output of this filter 171 is connected to one input of the third mixer 173. The second input of this mixer 123 is obtained by doubling the frequency of the signal existing at the output of filter 145 in the frequency doubler 149. The output of this mixer 173 is connected to the fourth filter/amplifier which selects and amplifies the signal whose frequency is equal to the sum of the two signals applied to the mixer 173. This signal is available at terminal 177 for transmission by the transponder transmitting antenna.

It will be appreciated from the foregoing description that the system illustrated utilizes randomly modulated signals so that a plurality of protected aircraft can interrogate a single intruding aircraft without requiring that each protected aircraft have a separate interrogating channel. Because each interrogating signal to an intruding aircraft generates a plurality of cross-modulating products, undesirable cross-modulation products must be suppressed. The undesired cross-modulation return products are suppressed by the receiver because its mixers are controlled by a local oscillator signal that is in turn controlled by the randomly modulated transmission signals. Therefore, this unique system results in satisfactory operation for two reasons: (1) because the interrogating distance of a protected aircraft can be limited so that it will only interrogate aircraft within a predetermined, limited range; and (2) because random modulation can be used to suppress undesired signals.

It should be noted that numerous antenna configurations can be utilized with the invention. The antenna configuration will be determined by the complexity of the overall system. That is, numerous directional antennas are well known in the art.

It will be appreciated that the invention, as herein described, provides a system for aiding a pilot in avoiding an aircraft collision. A simple transponder can be mounted in all aircraft because of its lack of complexity and, therefore, inexpensiveness. Further, aircraft that desire to have specific protection can carry transmitters and receivers so that they will be warned of approaching aircraft. In addition, the transmitter, receiver and transponder can vary in complexity in accordance with the general requirement of various civil, military and commercial aircraft.

It will also be appreciated by those skilled in the art and others that in light of the disclosure, numerous modifications can be made within the scope of the invention. The invention generally requires an apparatus carried on a protected aircraft for interrogating a transponder on an intruding aircraft. The transponder retransmits signals which are compared with the transmitted signal by the protected aircraft to determine if there is a possibility of a collision. If there is a possibility of a collision, the pilot of the protected aircraft can take the necessary evasive action. Numerous types of transponders, transmitters, and receivers, other than those specifically disclosed herein, can be used to perform these general functions. Hence, the invention can be practiced otherwise than as specifically disclosed herein.

What is claimed is:

1. Apparatus for aiding a pilot in avoiding a mid-air collision between aircraft comprising:
   transmitting means mounted on a protected aircraft for transmitting a continuous wave signal;
   said transmitting means comprising a noise generator, first and second oscillators connected to the output of said noise generator, a mixer connected to the outputs of said first and second oscillators, and first and second filter and amplifiers connected to the output of said mixer;
   transponder means mounted on an intruding aircraft for receiving said continuous wave signal, for electronically manipulating said signal, and for retransmitting a continuous wave signal; and
   receiving means mounted on the protected aircraft for receiving the signal retransmitted by said transponder means and for displaying an indication of the possibility of a collision between said intruding and protected aircraft.

2. Apparatus as claimed in claim 1, wherein said receiving means comprises:
   a local oscillator;
   a frequency doubler having its input connected to the output of one oscillator of said transmitter;
   a first mixer having one input connected to the output of said local oscillator and a second input connected to the output of said frequency doubler;
   a filter connected to the output of said first mixer;
   a filter and amplifier adapted to receive the retransmitted signal from said transponder means;
   a second mixer having one input connected to the output of said filter and a second input connected to the output of said filter and amplifier;
   an I.F. amplifier and filter having its input connected to the output of said second mixer;
   a third mixer having one input connected to the output of said I.F. filter and amplifier and a second input connected to the output of said local oscillator; and
   an I.F. amplifier having its input connected to the output of said third mixer.

3. Apparatus as claimed in claim 2, wherein said transponder means comprises:
   a first filter and amplifier adapted to receive a first signal;
   a second filter and amplifier adapted to receive a second signal;
   a mixer having its inputs connected to the outputs of said first and second filter and amplifiers; and
   a third filter and amplifier having its input connected to the output of said mixer.

4. Apparatus as claimed in claim 2, wherein said transponder means comprises:
   a first filter and mixer adapted to receive a first signal;
   a second filter and mixer adapted to receive a second signal;
   an oscillator having its output connected to the second inputs of said first and second filter and mixers;
   a first filter and amplifier having its input connected to the output of said first filter and mixer;
   a second filter and amplifier having its input connected to the output of said second filter and mixer;
   a balanced modulator having its input connected to the outputs of said first and second filter and amplifiers; and
   a third filter and amplifier having its input connected to the output of said balanced modulator.

5. Apparatus for mounting on a protected aircraft to aid it in avoiding mid-air collisions comprising:
   transmitting means for transmitting continuous wave signals;
   said transmitter means includes a noise generator for generating random signals, oscillator means connected to said noise generator for generating a signal that is randomly frequency modulated, and mixer means connected to said oscillator means for generating a pair of randomly modulated continuous wave signals;
   transponder means for receiving interrogating signals and for retransmitting signals;
   receiving means for receiving retransmitted signals; and
   local oscillator means connected to said transponder means and said receiver means.

6. Apparatus as claimed in claim 5, wherein said transponder means comprises:
   means for sensing interrogating signals and for modulating said signals by said local oscillator means; and
   means for mixing a pair of continuous wave interrogating signals and for generating a signal representing the difference between said interrogating signals.

7. Apparatus as claimed in claim 6, wherein said receiver means includes:
   means for sensing retransmitted signals from interrogated aircraft and for modulating said signals by said local oscillator means to suppress undesired retransmitted signals; and
   means for suppressing said local oscillator signal.

8. Apparatus for mounting on a protected aircraft to aid it in avoiding mid-air collisions comprising:
   transmitting means for transmitting continuous wave signals;
   said transmitter means comprising a noise generator, first and second oscillators connected to the output of said noise generator, a mixer connected to the output of said first and second oscillators, and first and second filter and amplifiers connected to the output of said mixer;
   transponder means for receiving interrogating signals and for retransmitting signals;
   receiving means for receiving retransmitted signals; and
   local oscillator means connected to said transponder means and said receiver means.

9. Apparatus as claimed in claim 8, wherein said transponder means comprises:
   a first mixer having one input connected to the output of said first oscillator of said transmitter means and the second input connected to an output of said local oscillator;
   a first filter connected to the output of said first mixer;
   a second mixer having one input connected to the output of said first filter and the second input connected to the output of the second oscillator of said transmitter means;
   second and third filters connected in parallel to the output of said second mixer;
   a first filter and mixer having one input adapted to receive an interrogating signal and a second input connected to said second filter;
   a second filter and mixer having one input adapted to receive an interrogating signal and a second input connected to said third filter;
   a first notch filter connected to the output of said first filter and mixer;

a second notch filter connected to the output of said second filter and mixer;

a first filter and amplifier connected to the output of said first notch filter;

a second filter and amplifier connected to the output of said second notch filter;

a balanced modulator having its inputs connected to the outputs of said first and second filter and amplifiers;

a third filter and amplifier connected to the output of said balanced modulator;

a third notch filter connected to the output of said third filter and amplifier;

a frequency doubler connected to the output of said first filter;

a third mixer having its inputs connected to the outputs of said frequency doubler and said notch filter; and a fourth filter and amplifier having its input connected to the output of said third mixer.

10. Apparatus as claimed in claim 9, wherein said receiver comprises:

a filter;

a first mixer having its input connected to the output of said filter and its second input connected to an output of said local oscillator;

a filter and amplifier having its input connected to the output of said mixer;

a second mixer having its input connected to the output of said filter and amplifier and its second input connected to an output of said oscillator; and a second filter and amplifier having its input connected to the output of said second mixer.

References Cited

UNITED STATES PATENTS

| 2,910,690 | 10/1959 | Ljungdahl | 343—6.5 |
| 3,046,548 | 7/1962 | Briskin. | |
| 3,067,417 | 12/1962 | Harding | 343—6.5 X |
| 3,290,677 | 12/1966 | Jacob | 343—6.5 X |

RODNEY D. BENNETT. JR., *Primary Examiner.*

M. F. HUBLER, *Assistant Examiner.*